United States Patent
Seino

(10) Patent No.: US 9,263,740 B2
(45) Date of Patent: Feb. 16, 2016

(54) BATTERY ANODE CONTAINING COSNC MATERIAL

(75) Inventor: Hiroshi Seino, Fukushima (JP)

(73) Assignee: Sony Corporation, Tokyo (JP)

( * ) Notice: Subject to any disclaimer, the term of this patent is extended or adjusted under 35 U.S.C. 154(b) by 1034 days.

(21) Appl. No.: 11/287,042

(22) Filed: Nov. 22, 2005

(65) Prior Publication Data
US 2006/0078793 A1 Apr. 13, 2006

(30) Foreign Application Priority Data
Dec. 1, 2004 (JP) ................ P2004-349166

(51) Int. Cl.
| | |
|---|---|
| H01M 2/16 | (2006.01) |
| H01M 4/13 | (2010.01) |
| H01M 4/38 | (2006.01) |
| H01M 4/134 | (2010.01) |
| H01M 10/052 | (2010.01) |
| H01M 10/0565 | (2010.01) |
| H01M 10/058 | (2010.01) |
| H01M 4/58 | (2010.01) |

(52) U.S. Cl.
CPC .............. *H01M 4/38* (2013.01); *H01M 2/1673* (2013.01); *H01M 4/134* (2013.01); *H01M 10/052* (2013.01); *H01M 10/058* (2013.01); *H01M 10/0565* (2013.01); *H01M 4/5825* (2013.01); *Y02E 60/122* (2013.01)

(58) Field of Classification Search
CPC ........................... H01M 2/1673; H01M 4/134
USPC ........................ 429/122–347; 29/623.1–623.5
See application file for complete search history.

(56) References Cited

U.S. PATENT DOCUMENTS

| | | | |
|---|---|---|---|
| 5,296,318 A * | 3/1994 | Gozdz et al. ................... 429/316 |
| 6,007,945 A * | 12/1999 | Jacobs et al. ............... 429/218.1 |
| 6,057,060 A * | 5/2000 | Yu ................................. 429/247 |
| 6,413,676 B1 | 7/2002 | Munshi | |
| 6,447,958 B1 * | 9/2002 | Shinohara et al. ............. 429/248 |
| 6,468,693 B1 * | 10/2002 | Takami et al. ................ 429/176 |
| 6,528,208 B1 * | 3/2003 | Thackeray et al. ......... 429/218.1 |
| 2002/0192549 A1 | 12/2002 | Maruyama et al. | |
| 2003/0148172 A1 | 8/2003 | Lascaud | |
| 2005/0250008 A1 * | 11/2005 | Mizutani et al. .............. 429/209 |

FOREIGN PATENT DOCUMENTS

| | | |
|---|---|---|
| EP | 0 971 433 | 7/1999 |
| EP | 0 982 790 | 9/1999 |
| EP | 1 075 037 | 2/2001 |
| JP | 2000-149906 A | 5/2000 |
| JP | 2001-043897 A | 2/2001 |
| JP | 2001-143701 A | 5/2001 |

(Continued)

*Primary Examiner* — Jonathan G Leong
(74) *Attorney, Agent, or Firm* — Sheridan Ross P.C.

(57) ABSTRACT

A battery capable of inhibiting swollenness of the battery is provided. A cathode and an anode are layered with a separator and an electrolyte layer in between. The anode contains an anode active material containing Sn or Si as an element. The electrolyte layer contains an electrolytic solution and a high molecular weight compound. It is preferable that the distance between the cathode and the anode is from 15 μm to 50 μm, and the distance between the cathode and the separator and the distance between the anode and the separator are respectively from 3 μm to 20 μm. Thereby, expansion of the anode is absorbed, stress on the anode is reduced, and occurrence of wrinkles in the anode is inhibited.

9 Claims, 2 Drawing Sheets

(56) References Cited

FOREIGN PATENT DOCUMENTS

| JP | 2003-303622 A | 10/2003 |
| JP | 2004-311108 A | 11/2004 |
| WO | WO 2004/100293 | 11/2004 |
| WO | WO 2004100291 A1 * | 11/2004 |

* cited by examiner

BATTERY ANODE CONTAINING CoSnC MATERIAL

CROSS REFERENCES TO RELATED APPLICATIONS

The present invention contains subject matter related to Japanese Patent Application JP 2004-349166 filed in the Japanese Patent Office on Dec. 1, 2004, the entire contents of which being incorporated herein by reference.

BACKGROUND OF THE INVENTION

1. Field of the Invention

The present invention relates to a battery in which a cathode and an anode are oppositely arranged with an electrolyte layer in between.

2. Description of the Related Art

In recent years, many portable electronic devices such as a combination camera, a mobile phone, and a notebook personal computer have been introduced, and downsizing of such devices has been made. Therefore, research for improving the energy density of the secondary battery used as a power source for such electronic devices has been promoted. Specially, since a lithium ion secondary battery can provide a higher energy density compared to a traditional lead battery or a traditional nickel cadmium battery, the lithium ion secondary battery is widely used.

In the lithium ion secondary battery, as an anode material, carbon materials such as non-graphitizable carbon and graphite have been traditionally used. However, since the capacity of such carbon materials is already saturated, it is difficult to further obtain a higher capacity. Therefore, as an anode material, using silicon (Si) or tin (Sn) has been considered (for example, refer to U.S. Pat. No. 4,950,566).

SUMMARY OF THE INVENTION

However, there has been a shortcoming that when silicon or tin is used for the anode, the anode is largely expanded and shrunk due to charge and discharge compared to the traditional carbon materials, in particular, in a battery using an package member such as a laminated film, it is difficult to prevent expansion of the element and thereby the battery is swollen. It is thinkable that such swollenness is caused by occurrence of wrinkles in the anode in the case that the anode is prevented from being expanded under stress of the cathode or the like.

In view of the foregoing, in the present invention, it is desirable to provide a battery capable of inhibiting swollenness.

According to an embodiment of the present invention, there is provided a battery in which a cathode and an anode are oppositely arranged with an electrolyte layer in between, wherein the anode contains an anode active material capable of inserting and extracting an electrode reactant and containing at least one of metal elements and metalloid elements as an element, and a distance between the cathode and the anode is from 15 μm to 50 μm in the region where the cathode and the anode are oppositely arranged with the electrolyte layer in between.

According to the battery of the embodiment of the present invention, since the distance between the cathode and the anode is 15 μm or more, expansion of the anode due to charge can be absorbed by the electrolyte layer, and stress on the anode can be reduced. Therefore, occurrence of wrinkles in the anode due to stress on the anode can be inhibited. Consequently, swollenness of the battery can be inhibited, and cycle characteristics can be improved. Further, since the distance between the cathode and the anode is 50 μm or less, increase in internal resistance can be inhibited, and cycle characteristics can be improved.

Other and further objects, features and advantages of the invention will appear more fully from the following description.

DETAILED DESCRIPTION OF THE PREFERRED EMBODIMENT

An embodiment of the present invention will be hereinafter described in detail with reference to the drawings.

Figure 1:
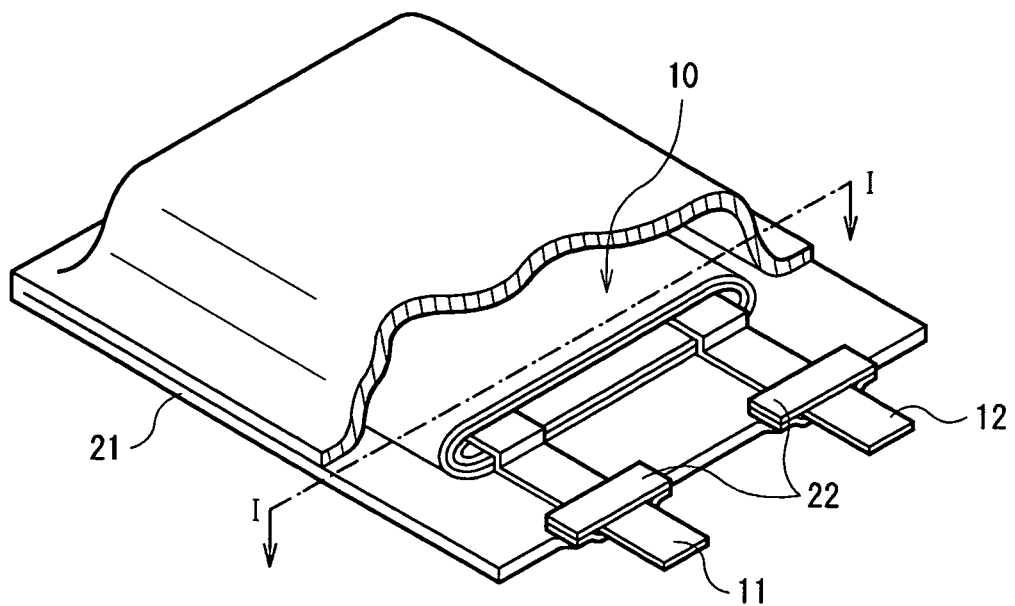
FIG. 1 is a partial cross section perspective view showing a structure of a secondary battery according to an embodiment of the present invention.

FIG. 1 shows a structure of a secondary battery according to an embodiment of the present invention. The secondary battery has a structure in which a battery element 10 to which a cathode lead 11 and an anode lead 12 are attached is contained inside a film package member 21.

The cathode lead 11 and the anode lead 12 are, for example, strip-shaped, respectively, are directed from inside to outside of the package member 21, and are derived in the same direction, for example. The cathode lead 11 is made of, for example, a metal material such as aluminum (Al), and the anode lead 12 is made of, for example, a metal material such as nickel (Ni).

The package member 21 has a structure in which an insulating layer, a metal layer, and an outermost layer are layered in this order and bonded together by laminating process or the like. The respective outer edges of the package member 21 are contacted to each other by fusion bonding or an adhesive with the insulating layer inside, for example.

The insulating layer is made of, for example, a polyolefin resin of polyethylene, polypropylene, modified polyethylene, modified polypropylene, a copolymer thereof or the like, since water permeability can be thereby decreased and airtightness thereof is superior. The metal layer is made of foil-shaped or plate-shaped aluminum, stainless, nickel, iron (Fe) or the like. The outermost layer may be made of, for example, a resin similar to of the insulating layer, or may be made of nylon or the like, since strength to break, piercing or the like can be thereby improved. The package member 21 may include other layers in addition to the insulating layer, the metal layer, and the outermost layer.

Adhesive films 22 to improve contact characteristics between the cathode lead 11, the anode lead 12 and inside of the package member 21 and to protect from outside air intrusion are inserted between the package member 21 and the cathode lead 11, the anode lead 12. The adhesive film 22 is made of a material having contact characteristics to the cathode lead 11 and the anode lead 12. For example, when the cathode lead 11 and the anode lead 12 are made of the foregoing metal materials, the adhesive film 22 is preferably made of a polyolefin resin of polyethylene, polypropylene, modified polyethylene, modified polypropylene or the like.

Figure 2:
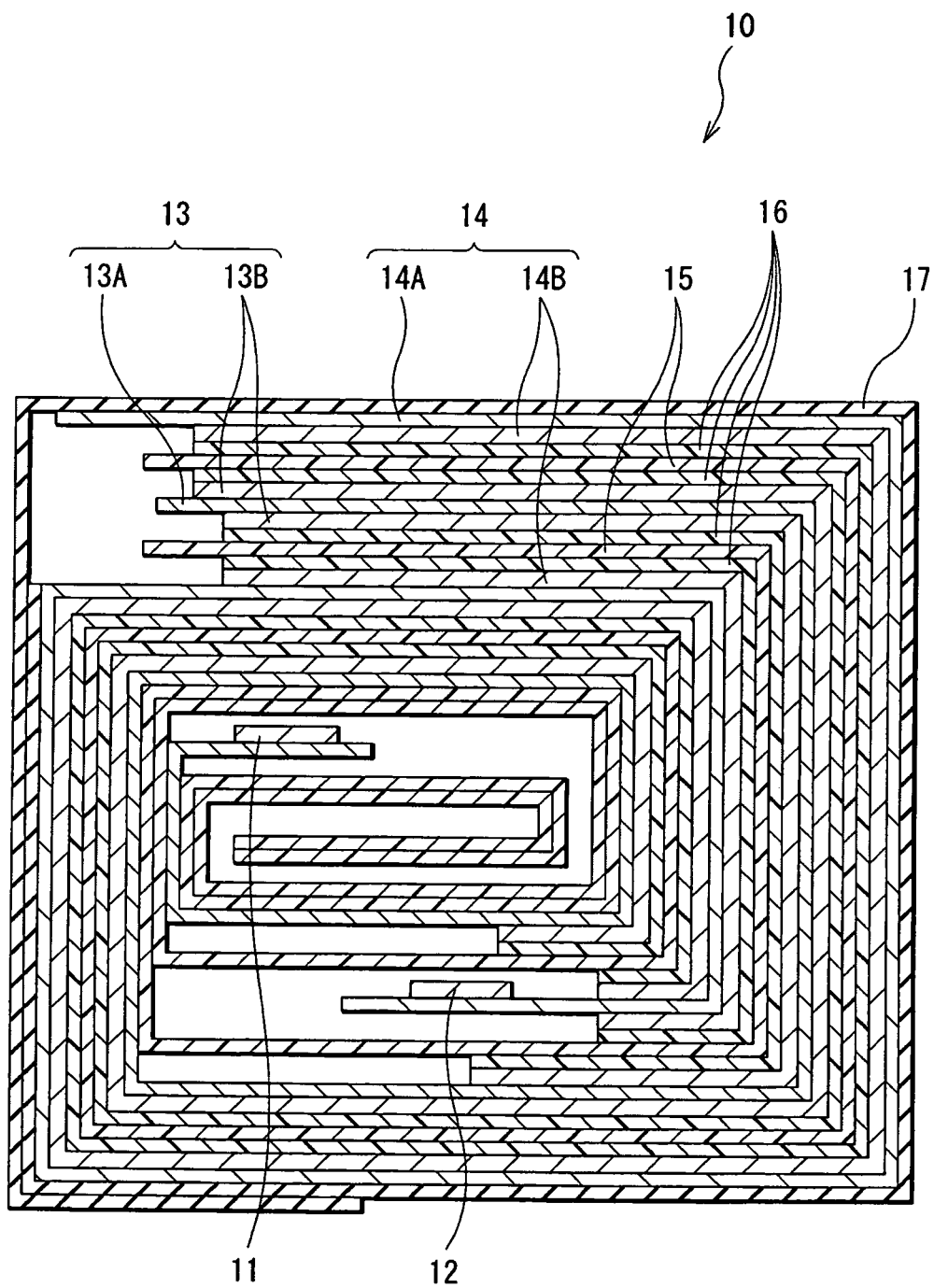
FIG. 2 is a cross section showing a structure taken along line I-I of a battery element shown in FIG. 1.

FIG. 2 shows a cross sectional structure taken along line I-I of the battery element 10 shown in FIG. 1. In the battery element 10, a cathode 13 and an anode 14 are layered with a separator 15 and an electrolyte layer 16 in between and wound. The outermost periphery thereof is protected by a protective tape 17.

The cathode 13 has, for example, a cathode current collector 13A and a cathode active material layer 13B provided on the both faces of the cathode current collector 13A. In the cathode current collector 13A, for example, there is an exposed portion at one end in the longitudinal direction, in which the cathode active material layer 13B is not provided. The cathode lead 11 is attached to the exposed section. The cathode current collector 13A is made of, for example, a metal foil such as an aluminum foil.

The cathode active material layer 13B contains, for example, as a cathode active material, one or more cathode materials capable of inserting and extracting lithium (Li), which is the electrode reactant. If necessary, the cathode active material layer 13B may contain an electrical conductor such as a carbon material and a binder such as polyvinylidene fluoride and polytetrafluoro ethylene. As a cathode material capable of inserting and extracting lithium, for example, a lithium complex oxide containing lithium and transition metals or a lithium phosphate compound is preferable, because these can generate a high voltage and have a high density, and therefore they can contribute to a high capacity.

As a lithium complex oxide, a compound containing, as a transition metal, at least one from the group consisting of cobalt (Co), nickel, manganese (Mn), iron, vanadium (V), titanium (Ti), chromium (Cr), and copper (Cu) is preferable. In particular, a compound containing at least one from the group consisting of cobalt, nickel, and manganese is more preferable. As a specific example of such a lithium complex oxide, $LiCoO_2$, $LiNiO_2$, $LiMn_2O_4$, $LiNi_{0.5}Co_{0.5}O_2$ or the like can be cited. As a lithium phosphate compound, for example, $LiFePO_4$ or $LiFe_{0.5}Mn_{0.5}PO_4$ can be cited.

As the cathode 13, the anode 14 has, for example, an anode current collector 14A and an anode active material layer 14B provided on the both faces of the anode current collector 14A. In the anode current collector 14A, for example, there is an exposed section at one end in the longitudinal direction, in which the anode active material layer 14B is not provided. The anode lead 12 is attached to the exposed section. The anode current collector 14A is made of, for example, a metal foil such as a copper foil.

The anode active material layer 14B contains, for example, as an anode active material, an anode material capable of inserting and extracting lithium as the electrode reactant and containing at least one of metal elements and metalloid elements as an element. When such an anode material is used, a high energy density can be obtained. The anode material may be a simple substance, an alloy, or a compound of a metal element or a metalloid element, or a material having one or more phases thereof at least in part. In the present invention, alloys include an alloy containing one or more metal elements and one or more metalloid elements in addition to an alloy including two or more metal elements. Further, an alloy may contain nonmetallic elements. The texture thereof includes a solid solution, a eutectic crystal (eutectic mixture), an intermetallic compound, and a texture in which two or more thereof coexist.

As a metal element or a metalloid element composing the anode material, for example, a metal element or a metalloid element capable of forming an alloy with lithium is cited. Specifically, magnesium (Mg), boron (B), aluminum, gallium (Ga), indium (In), silicon, germanium (Ge), tin, lead (Pb), bismuth (Bi), cadmium (Cd), silver (Ag), zinc (Z), hafnium (Hf), zirconium (Zr), yttrium (Y), palladium (Pd), platinum (Pt) or the like can be cited.

Specially, as such an anode material, a material containing a metal element or a metalloid element of Group 14 in the long period periodic table as an element is preferable. A material containing at least one of silicon and tin as an element is particularly preferable. Silicon and tin have a high ability to insert and extract lithium, and can provide a high energy density.

As an alloy of tin, for example, an alloy containing at least one from the group consisting of silicon, nickel, copper, iron, cobalt, manganese, zinc, indium, silver, titanium (Ti), germanium, bismuth, antimony (Sb), and chromium (Cr) as a second element other than tin can be cited. As an alloy of silicon, for example, an alloy containing at least one from the group consisting of tin, nickel, copper, iron, cobalt, manganese, zinc, indium, silver, titanium, germanium, bismuth, antimony, and chromium as a second element other than silicon can be cited.

As a compound of tin or a compound of silicon, for example, a compound containing oxygen (O) or carbon (C) can be cited. In addition to tin or silicon, the compound may contain the foregoing second element.

Specially, as such an anode material, a CoSnC-containing material containing tin, cobalt, and carbon as an element, in which the carbon content is from 9.9 wt % to 29.7 wt %, and the ratio of cobalt to the total of tin and cobalt is from 30 wt % to 70 wt % is preferable. In such a composition range, a high energy density can be obtained, and superior cycle characteristics can be obtained.

The CoSnC-containing material may further contain other elements if necessary. As other element, for example, silicon, iron, nickel, chromium, indium, niobium (Nb), germanium, titanium, molybdenum (Mo), aluminum, phosphorus (P), gallium (Ga), or bismuth is preferable. Two or more thereof may be contained, since a capacity or cycle characteristics can be thereby further improved.

The CoSnC-containing material has a phase containing tin, cobalt, and carbon. The phase preferably has a structure with low crystalline or an amorphous structure. Further, it is preferable that in the CoSnC-containing material, at least part of carbon as the element is bonded to a metal element or a metalloid element, which is other element. It is thinkable that lowered cycle characteristics are caused by cohesion or crystallization of tin or the like. Such cohesion or crystallization can be inhibited by bonding carbon to other element.

As a measuring method for examining bonding state of elements, for example, X-ray Photoelectron Spectroscopy (XPS) can be cited. In XPS, in the case of graphite, the peak of is orbital of carbon (C1s) is observed at 284.5 eV in the apparatus in which energy calibration is made so that the peak of 4f orbital of gold atom (Au4f) is observed at 84.0 eV. In the case of surface contamination carbon, the peak is observed at 284.8 eV. Meanwhile, in the case of higher electric charge density of carbon element, for example, when carbon is bonded to a metal element or a metalloid element, the peak of C1s is observed in the region lower than 284.5 eV. That is, when the peak of the composite wave of C1s obtained for the CoSnC-containing material is observed in the region lower than 284.5 eV, at least part of carbon contained in the CoSnC-containing material is bonded to the metal element or the metalloid element, which is other element.

In XPS measurement, for example, the peak of C1s is used for correcting the energy axis of spectrums. Since surface contamination carbon generally exists on the surface, the peak of C1s of the surface contamination carbon is set at 284.8 eV, which is used as an energy reference. In XPS measurement, the waveform of the peak of C1s is obtained as a form including the peak of the surface contamination carbon and the peak of carbon in the CoSnC-containing material. Therefore, by analyzing the waveform by using a commercially available software or the like, the peak of the surface contamination carbon and the peak of carbon in the CoSnC-containing material are separated. In the analysis of the waveform, the position of the main peak existing on the lowest bound energy side is set to the energy reference (284.8 eV).

The anode active material layer 14B may further contain other anode active material. Further, the anode active material layer 14B may contain other material not contributing to charge such as an electrical conductor, a binder, and a viscosity modifier. As other anode active material, for example, carbon materials such as natural graphite, artificial graphite, non-graphitizable carbon, and graphitizable carbon can be cited. As an electrical conductor, carbon materials or the like can be cited. As a binder, a fluorinated high molecular weight compound such as polyvinylidene fluoride can be cited. As a viscosity modifier, carboxymethyl cellulose or the like can be cited.

The separator 15 separates the anode 14 from the cathode 13, prevents current short circuit due to contact of both electrodes, and lets through lithium ions. As a material composing the separator 15, for example, a synthetic resin of polytetrafluoroethylene, polypropylene, polyethylene or the like can be cited. The porosity of the separator 15 is preferably from 30% to 60%. When the porosity is smaller than the foregoing value, output characteristics are lowered. Meanwhile, when the porosity is larger than the foregoing value, mechanical strength is lowered. The pore size of void is preferably 1 μm or less. When the void is large, it is difficult to prevent internal short-circuit, and it is also difficult to obtain shutdown effects by void blockage. The thickness of the separator 15 is preferably from 5 μm to 35 μm, and more preferably from 7 μm to 20 μm. When the separator 15 is thin, mechanical strength is lowered. Meanwhile, when the separator 15 is thick, internal resistance is increased.

The electrolyte layer 16 contains an electrolytic solution and a high molecular weight compound to hold the electrolytic solution. The electrolyte layer 16 is so-called gelatinous. The electrolyte layer 16 is provided between the cathode 13 and the separator 15, and between the anode 14 and the separator 15.

The electrolytic solution contains an electrolyte salt and a solvent to dissolve the electrolyte salt. As an electrolyte salt, for example, a lithium salt such as $LiClO_4$, $LiPF_6$, $LiBF_4$, $LiN(SO_2CF_3)_2$, $LiN(SO_2C_2F_5)_2$, and $LiAsF_6$ can be cited. As an electrolyte salt, any of the forgoing may be used singly, or two or more thereof may be used by mixing.

As a solvent, for example, a nonaqueous solvent such as ethylene carbonate, propylene carbonate, dimethyl carbonate, diethyl carbonate, methyl ethyl carbonate, 1,2-dimethoxy ethane, 1,2-diethoxy ethane, γ-butyrolactone, γ-valerolactone, tetrahydrofuran, 2-methyl tetrahydrofuran, 1,3-dioxolane, 4-methyl-1,3-dioxolane, 1,3-dioxole-2-one, 4-vinyl-1,3-dioxolane-2-one, 4-fluoro-1,3-dioxolane-2-one, diethyl ether, sulfolane, methyl sulfolane, acetonitrile, propionitrile, anisole, ester acetate, ester butyrate, ester propionate, fluoro benzene, tert-butyl benzene, tert-cyclo hexyl benzene, and ethylene sulfite can be cited. The solvent may be used singly, or two or more thereof may be used by mixing.

Any high molecular weight compound may be used as long as the high molecular weight compound can absorb and gelate the solvent. Examples of high molecular weight compound are a polymer containing vinylidene fluoride as a component such as polyvinylidene fluoride and a copolymer of vinylidene fluoride and hexafluoropropylene; an ether high molecular weight compound such as polyethylene oxide and a cross-linked body containing polyethylene oxide; polyacrylonitrile; a compound containing polypropylene oxide or polymethacrynitrile as a repeating unit or the like. For the high molecular weight compound, any of the foregoing may be used singly, or two or more thereof may be used by mixing.

In particular, in view of redox stability, the polymer containing vinylidene fluoride as a component is desirable. Specially, the copolymer containing vinylidene fluoride and hexafluoropropylene as a component is preferable. Further, the copolymer may contain as a component a monoester of unsaturated dibasic acid such as monomethyl ester maleate, an ethylene halide such as ethylene chloride trifluoride, cyclic ester carbonate of an unsaturated compound such as vinylene carbonate, an epoxy-group-containing acryl vinyl monomer or the like, since thereby higher characteristics can be obtained. The copolymerization amount of components to be copolymerized with vinylidene fluoride, for example, the copolymerization amount obtained by summing up hexafluoropropylene, a monoester having unsaturated dibasic acid, ethylene halide, cyclic ester carbonate of an unsaturated compound, and epoxy-group-containing acryl vinyl monomer is preferably from 3 wt % to 20 wt % to the whole copolymer. When the copolymerization amount is less than the foregoing value, it is difficult to synthesize the copolymer. Meanwhile, when the copolymerization amount is larger than the foregoing value, electrochemical stability of the copolymer is lowered, and battery characteristics are lowered.

As a polymer containing vinylidene fluoride as a component, it is preferable that the polymer with high molecular weight whose weight-average molecular weight is from 0.5 million to 0.8 million, and the polymer with low molecular weight whose weight-average molecular weight is from 0.3 million to 0.55 million are used by mixing thereof. It is preferable that the ratio of the polymer with low molecular weight is 40 wt % or less. When the molecular weight is large, the polymer is hardly dissolved in the solvent and is hardly manufactured. Meanwhile, if only the polymer with low molecular weight is used, film strength of the electrolyte layer 16 weakens.

In the secondary battery, the distance between the cathode 13 and the anode 14 is in the range from 15 μm to 50 μm in the region where the cathode 13 and the anode 14 are oppositely arranged with the electrolyte layer 16 in between. When the distance is narrower than the foregoing value, it is difficult to sufficiently absorb expansion of the anode 14 in charging, and wrinkles in the anode 14 are caused under stress on the anode 14. When the distance is wider than the foregoing value, the internal resistance becomes large. Further, the thickness of the electrolyte layer 16 provided between the cathode 13 and the separator 15 and between the anode 14 and the separator 15, that is, the distance between the cathode 13 and the separator 15 and the distance between the anode 14 and the separator 15 are preferably in the range from 3 μm to 20 μm, respectively, since thereby higher effects can be obtained.

The secondary battery having the foregoing structure can be manufactured, for example, as follows.

First, for example, a cathode active material, an electrical conductor, a binder and the like are mixed to prepare a cathode mixture, which is dispersed in a solvent such as N-methyl-2-pyrrolidone to obtain cathode mixture slurry. Next, the both faces of the cathode current collector 13A are coated with the cathode mixture slurry, which is dried and compression-molded, and thereby the cathode active material layer 13B is formed and the cathode 13 is formed. Subsequently, for example, the cathode lead 11 is joined to the cathode current collector 13A.

Further, for example, an anode active material, an electrical conductor, a binder and the like are mixed to prepare an anode mixture, which is dispersed in a solvent such as N-methyl-2-pyrrolidone to obtain anode mixture slurry. Next, the both faces of the anode current collector 14A are coated with the anode mixture slurry, which is dried and compression-molded, and thereby the anode active material layer 14B is formed and the anode 14 is formed. After the anode active material layer 14B is formed as above, firing may be performed thereto. Otherwise, the anode active material layer 14B may be formed on the anode current collector 14A by vapor-phase deposition method or liquid-phase deposition method. Subsequently, the anode lead 12 is joined to the anode current collector 14A.

After that, for example, a precursor solution is formed by mixing an electrolytic solution and a high molecular weight compound by using a mixed solvent. Next, the cathode active material layer 13B and the anode active material layer 14B are coated with the precursor solution. The mixed solvent is volatilized to form the electrolyte layer 16. Then, the thickness of the electrolyte layer 16 is adjusted so that the distance between the cathode 13 and the anode 14 falls within the foregoing range. Subsequently, the anode 14 formed with the electrolyte layer 16, the separator 15, the cathode 13 formed with the electrolyte layer 16, and the separator 15 are orderly layered and wound, the protective tape 17 is adhered to the outermost periphery thereof to form the battery element 10. After that, the battery element 10 is sandwiched between the package members 21, and outer edges of the package members 21 are thermal fusion-bonded. Then, the adhesive films 22 are inserted between the cathode lead 11, the anode lead 12 and the package member 21. Thereby, the secondary battery shown in FIG. 1 and FIG. 2 is obtained.

In the secondary battery, when charged, lithium ions are extracted from the cathode 13 and inserted in the anode 14 through the electrolyte layer 16. When discharged, for example, lithium ions are extracted from the anode 14 and inserted in the cathode 13 through the electrolyte layer 16. Then, since the distance between the cathode 13 and the anode 14 is 15 μm or more, expansion of the anode 14 due to charge is absorbed by the electrolyte layer 16, and stress on the anode 14 is reduced. Therefore, occurrence of wrinkles in the anode 14 is inhibited, and expansion of the battery is inhibited.

As above, according to the secondary battery of this embodiment, since the distance between the cathode 13 and the anode 14 is 15 μm or more, expansion of the anode 14 due to charge can be absorbed by the electrolyte layer 16, and stress on the anode 14 can be reduced. Therefore, occurrence of wrinkles in the anode 14 due to stress on the anode 14 can be inhibited, swollenness of the battery can be inhibited, and cycle characteristics can be improved. Further, since the distance between the cathode 13 and the anode 14 is 50 μm or less, increase in internal resistance can be inhibited, and cycle characteristics can be improved.

EXAMPLES

Further, specific examples of the present invention will be hereinafter given in detail with reference to the drawings.

Examples 1 to 10

First, lithium cobalt complex oxide ($LiCoO_2$) powder as the cathode active material, graphite as the electrical conductor, polyvinylidene fluoride as the binder were mixed to prepare a cathode mixture, which was dispersed in N-methyl-2-pyrrolidone as the solvent to form cathode mixture slurry. Next, the both faces of the cathode current collector 13A made of an aluminum foil were coated with the cathode mixture slurry, which was dried, and then compression-molded to form the cathode active material layer 13B. Thereby, the strip-shaped cathode 13 was formed. Subsequently, the cathode lead 11 was welded to the end of the cathode 13.

Further, CoSnC-containing material powder as the anode active material, graphite and acetylene black as the electrical conductor and the anode active material, and polyvinylidene fluoride as the binder were mixed to prepare the anode mixture, which was dispersed in N-methyl-2-pyrrolidone as the solvent to form anode mixture slurry. Next, the both faces of the anode current collector 14A made of a copper foil were coated with the anode mixture slurry, which was dried, and then compression-molded to form the anode active material layer 14B. Thereby, the strip-shaped anode 14 was formed. Subsequently, the anode lead 12 was welded to the end of the anode 14.

The CoSnC-containing material was synthesized by utilizing mechanochemical reaction of cobalt-tin alloy powder and carbon powder by using a planetary ball mill. For the formed CoSnC-containing material, composition analysis was performed. The cobalt content was 29.3 wt %, the tin content was 49.9 wt %, and the carbon content was 19.8 wt %. The carbon content was measured by a carbon sulfur analyzer. The contents of cobalt and tin were measured by ICP (Inductively Coupled Plasma) optical emission spectroscopy. Further, regarding the obtained CoSnC-containing material, X-ray diffraction was performed. In the result, the diffraction peak having a wide half value width with the diffraction angle 2θ of 1.0 degree or more was observed in the range of diffraction angle 2θ=2θ to 50 degrees. Further, when XPS was performed on the CoSnC-containing material, the peak of C1s in the CoSnC-containing material was obtained in the region lower than 284.5 eV. That is, it was confirmed that carbon in the CoSnC-containing material was bonded to other element.

Next, ethylene carbonate and propylene carbonate were mixed at a weight ratio of 1:1. $LiPF_6$ as the electrolyte salt was dissolved in the mixture at a concentration of 0.6 mol/kg, and 1,3-dioxole-2-one was added to the mixture so that the concentration in the electrolytic solution became 1.3 wt % to prepare the electrolytic solution. Subsequently, as a high molecular weight compound as the holding body, a copolymer of vinylidene fluoride and hexafluoropropylene was prepared. Such a high molecular weight compound and the electrolytic solution were mixed by using a mixed solvent to form a sol precursor solution. The ratio of hexafluoropropylene in the copolymer was 6.9 wt %.

After that, the cathode 13 and the anode 14 were respectively coated with the precursor solution. The mixed solvent was volatilized to form the gelatinous electrolyte layer 16. Then, by changing the thickness of the electrolyte layer 16 in Examples 1 to 10 as shown in Table 1, the distance between the cathode 13 and the anode 14 was changed. After the electrolyte layer 16 was formed, the cathode 13 and the anode 14 were bonded together with the separator 15 in between, the lamination was flatly wound to form the battery element 10. For the separator 15, a porous polyethylene film being 9 μm thick having a porosity of 35% was used. Next, the formed battery element 10 was sandwiched between the package members 21 made of an aluminum laminated film. After that, the outer edges of the package member 21 were bonded together to obtain a secondary battery.

Further, as Comparative examples 1 to 3 relative to Examples 1 to 10, secondary batteries were fabricated as in Examples 1 to 10, except that the distance between the cathode 13 and the anode 14 was changed by changing the thickness of the electrolyte layer 16 as shown in Table 1.

For the fabricated secondary batteries of Examples 1 to 10 and Comparative examples 1 to 3, the thickness of the battery before the initial charge and discharge and the thickness of the battery at the initial charge were measured, and the increase ratio of the battery thickness was obtained by (battery thickness at the initial charge/battery thickness before the initial charge and discharge)×100. Further, 300 cycles of charge and discharge were performed, and the capacity retention ratio of the discharge capacity at the 300th cycle to the discharge capacity at the 5th cycle was obtained by (discharge capacity at the 300th cycle/discharge capacity at the 5th cycle)×100. Regarding charge, constant current and constant voltage charge with the upper voltage of 4.2 V and a current of 0.5 C was performed. Regarding discharge, constant current discharge with a current of 0.5 C and the final voltage of 2.5 V was performed. 0.5 C means a current value at which the battery capacity can be discharged for 2 hours. The obtained results are shown in Table 1.

and various modifications may be made. For example, in the foregoing embodiment and examples, descriptions have been given of the case that after the electrolyte layer 16 is formed on the cathode 13 and the anode 14, the lamination is wound to form the battery element 10. However, it is possible that after the cathode 13 and the anode 14 are wound and the winding body is contained inside the package member 21, an electrolyte composition of matter containing an electrolytic solution, a monomer as the raw material of the high molecular weight compound, a polymerization initiator if necessary and the like is injected, the monomer is polymerized, and thereby the electrolyte layer 16 is formed.

Further, in the foregoing embodiment and examples, descriptions have been given of the case that the battery element 10 is wound. However, the present invention can be similarly applied to the case including a card-type battery element in which a cathode and an anode are layered with a separator and an electrolyte layer in between; the case including a lamination-type battery element in which two or more cathodes and two or more anodes are alternately layered with a separator and an electrolyte layer in between; or the case including a battery element in which a cathode and an anode are layered with a separator and an electrolyte layer in between and folded.

TABLE 1

| | Distance between cathode and anode (μm) | Thickness of electrolyte layer on anode side (μm) | Thickness of electrolyte layer on cathode side (μm) | Battery thickness (μm) | | Increase ratio of battery thickness (%) | Capacity retention ratio (%) |
| --- | --- | --- | --- | --- | --- | --- | --- |
| | | | | Before charge | At initial charge | | |
| Example 1 | 15 | 3 | 3 | 3.68 | 4.12 | 12 | 80 |
| Example 2 | 20 | 5 | 6 | 3.74 | 4.19 | 12 | 80 |
| Example 3 | 20 | 8 | 3 | 3.75 | 4.16 | 11 | 83 |
| Example 4 | 25 | 10 | 6 | 3.79 | 4.20 | 11 | 81 |
| Example 5 | 31 | 3 | 19 | 4.17 | 4.67 | 12 | 81 |
| Example 6 | 32 | 3 | 20 | 4.23 | 4.70 | 11 | 82 |
| Example 7 | 32 | 20 | 3 | 4.24 | 4.62 | 9 | 80 |
| Example 8 | 33 | 21 | 3 | 4.27 | 4.61 | 8 | 78 |
| Example 9 | 49 | 20 | 20 | 5.23 | 5.65 | 8 | 80 |
| Example 10 | 50 | 20 | 21 | 5.29 | 5.71 | 8 | 78 |
| Comparative example 1 | 13 | 2 | 2 | 3.56 | 4.55 | 28 | 65 |
| Comparative example 2 | 14 | 2 | 3 | 3.62 | 4.53 | 25 | 69 |
| Comparative example 3 | 51 | 20 | 22 | 5.35 | 5.78 | 8 | 69 |

As shown in Table 1, according to Examples 1 to 10, in which the distance between the cathode 13 and the anode 14 was from 15 μm to 50 μm, the increase ratio of the battery thickness could be 12% or less, and the capacity retention ratio could be 78% or more. Meanwhile, in Comparative examples 1 and 2, in which the distance between the cathode 13 and the anode 14 was under 15 μm, the increase ratio of the battery thickness was large, 25% or more, and the capacity retention ratio was low, 69% or less. Further, in Comparative example 3, in which the distance between the cathode 13 and the anode 14 was wider than 50 μm, the increase ratio of the battery thickness could be small, but the capacity retention ratio was low, 69%.

That is, it was found that when the distance between the cathode 13 and the anode 14 was from 15 μm to 50 μm, swollenness of the battery could be inhibited and cycle characteristics could be improved. Further, it was found that the distance between the cathode 13 and the separator 15, and the distance between the anode 14 and the separator 15 were preferably from 3 μm to 20 μm, respectively.

The present invention has been described with reference to the embodiment and the examples. However, the present invention is not limited to the embodiment and the examples, Further, in the foregoing embodiment and examples, descriptions have been given of the case that the electrolyte layer 16 contains a high molecular weight compound as a holding body. However, in addition to the high molecular weight compound, an inorganic compound may be mixed thereto.

In addition, in the foregoing embodiment and examples, descriptions have been given of the case using lithium for electrode reaction. However, the present invention can be also applied to the case that other alkali metal such as sodium (Na) and potassium (K), an alkali earth metal such as magnesium and calcium (Ca), other light metal such as aluminum, or an alloy of lithium or the foregoing metals is used. In this case, similar effects can be obtained.

Furthermore, the present invention can be applied not only to the secondary batteries, but also to primary batteries.

It should be understood by those skilled in the art that various modifications, combinations, sub-combinations and alternations may occur depending on design requirements and other factors insofar as they are within the scope of the appended claims or the equivalents thereof.

What is claimed is:

1. A battery comprising:
a battery element;
a film outer package member in which the battery element is contained;
a cathode; and
an anode that is oppositely arranged to the cathode with a gelatinous electrolyte layer in between;
wherein the anode contains an anode active material that includes a CoSnC material and at least one element selected from the group consisting of a titanium (Ti), a molybdenum (Mo), a phosphorus (P), and a gallium (Ga) material, and the anode active material is capable of inserting and extracting an electrode reactant and containing at least one of metal elements and metalloid elements;
a distance between the cathode and the anode is between about 15 μm to 50 μm in the region where the cathode and the anode are oppositely arranged with the gelatinous electrolyte layer positioned therebetween;
the gelatinous electrolyte layer contains a polymer and an electrolytic solution; and
a distance between a separator and the cathode and a distance between the separator and the anode are each between about 3 μm to 20 μm in the region where the electrolyte layer is provided;
wherein the content of the Co in the CoSnC material is 29.3 wt %, the content of the Sn in the CoSnC material is 49.9 wt %, and the content of the C in the CoSnC material is 19.8 wt %; and
wherein the distance between the cathode and the anode is 32 μm, the distance between the separator and the cathode is 20 μm, and the distance between the separator and the anode is 3 μm.

2. The battery according to claim 1 wherein a battery thickness before charge is 4.23 μm and a battery thickness after charge is 4.70 μm.

3. A battery comprising:
a battery element;
a film outer package member in which the battery element is contained;
a cathode; and
an anode that is oppositely arranged to the cathode with a gelatinous electrolyte layer in between;
wherein the anode contains an anode active material that includes a CoSnC material and at least one element selected from the group consisting of a titanium (Ti), a molybdenum (Mo), a phosphorus (P), and a gallium (Ga) material, and the anode active material is capable of inserting and extracting an electrode reactant and containing at least one of metal elements and metalloid elements;
a distance between the cathode and the anode is between about 15 μm to 50 μm in the region where the cathode and the anode are oppositely arranged with the gelatinous electrolyte layer positioned therebetween;
the gelatinous electrolyte layer contains a polymer and an electrolytic solution; and
a distance between a separator and the cathode and a distance between the separator and the anode are each between about 3 μm to 20 μm in the region where the electrolyte layer is provided;
wherein the content of the Co in the CoSnC material is 29.3 wt %, the content of the Sn in the CoSnC material is 49.9 wt %, and the content of the C in the CoSnC material is 19.8 wt %; and
wherein the distance between the cathode and the anode is 32 μm, the distance between the separator and the cathode is 3 μm, and the distance between the separator and the anode is 20 μm.

4. The battery according to claim 3 wherein a battery thickness before charge is 4.24 μm and a battery thickness after charge is 4.62 μm.

5. A battery comprising:
a battery element;
a film outer package member in which the battery element is contained;
a cathode; and
an anode that is oppositely arranged to the cathode with a gelatinous electrolyte layer in between;
wherein the anode contains an anode active material that includes a CoSnC material and at least one element selected from the group consisting of a titanium (Ti), a molybdenum (Mo), a phosphorus (P), and a gallium (Ga) material, and the anode active material is capable of inserting and extracting an electrode reactant and containing at least one of metal elements and metalloid elements;
a distance between the cathode and the anode is between about 15 μm to 50 μm in the region where the cathode and the anode are oppositely arranged with the gelatinous electrolyte layer positioned therebetween;
the gelatinous electrolyte layer contains a polymer and an electrolytic solution; and
a distance between a separator and the cathode and a distance between the separator and the anode are each between about 3 μm to 20 μm in the region where the electrolyte layer is provided;
wherein the content of the Co in the CoSnC material is 29.3 wt %, the content of the Sn in the CoSnC material is 49.9 wt %, and the content of the C in the CoSnC material is 19.8 wt %; and
wherein the distance between the cathode and the anode is 33 μm, the distance between the separator and the cathode is 3 μm, and the distance between the separator and the anode is 21 μm.

6. The battery according to claim 5 wherein a battery thickness before charge is 4.27 μm and a battery thickness after charge is 4.61 μm.

7. The battery according to claim 2 wherein a capacity retention ratio is 82%.

8. The battery according to claim 4 wherein a capacity retention ratio is 80%.

9. The battery according to claim 6 wherein a capacity retention ratio is 78%.

* * * * *